US006161002A

United States Patent [19]

Migliaccio et al.

[11] Patent Number: 6,161,002

[45] Date of Patent: Dec. 12, 2000

[54] APPARATUS AND METHOD FOR THE RECEPTION OF RADIO SIGNALS TRANSMITTED BY RDS SYSTEM

[76] Inventors: Riccardo Migliaccio, Viale dei Colli Portuensi 579; Francesco Paviato, Via Adolfo Gandiglio 84, both of 00151 Rome, Italy

[21] Appl. No.: 09/182,661

[22] Filed: Oct. 30, 1998

[30] Foreign Application Priority Data

Nov. 18, 1997 [IT] Italy ................................ RM97A0712

[51] Int. Cl.[7] ....................................................... H04B 1/16

[52] U.S. Cl. ..................... 455/150.1; 455/45; 455/151.1; 455/151.2; 455/158.4; 455/186.1

[58] Field of Search .................................... 455/45, 186.1, 455/150.1, 151.1, 151.2, 158.4

[56] References Cited

U.S. PATENT DOCUMENTS 5,345,602 9/1994 Wiedemann et al. .................. 455/137
5,428,825 6/1995 Tomohiro et al. .................. 455/186.1
5,457,816 10/1995 Koyama .............................. 455/161.2
5,471,662 11/1995 Shiota ................................ 455/166.1
5,749,048 5/1998 Masuda ............................... 455/186.1
5,812,937 9/1998 Takahisa et al. ......................... 455/66

*Primary Examiner*—Dwayne D. Bost
*Assistant Examiner*—Temica M. Davis
*Attorney, Agent, or Firm*—Browdy and Neimark

[57] ABSTRACT

An apparatus and a method for the reception of radio signals transmitted by an RDS system provide the selection and reception of a first frequency; the selection, during the reception of the first frequency, of a second frequency, different from the first frequency and not included in the AF list of frequencies alternative to the first frequency; and the switching of the reception between the first and second frequency upon comparison of RDS data relative to the second frequency with previously stored RDS data.

16 Claims, 4 Drawing Sheets

SWITCHING WITH MANUAL ACCEPTING MODE

SWITCHING WITH AUTO-ACCEPTING MODE

APPARATUS AND METHOD FOR THE RECEPTION OF RADIO SIGNALS TRANSMITTED BY RDS SYSTEM

FIELD OF THE INVENTION

The present invention relates to an apparatus and a method for the reception of radio signals transmitted by RDS system.

BACKGROUND OF THE INVENTION

Most radio stations combine broadcasting of radio programs with transmission of auxiliary alphanumeric data on a subcarrier of the program being broadcast. In this way messages of various kinds are provided. Among them, in particular, time program and station identification codes, road traffic forecast and so on. Such subcarrier transmission is referred to by the abbreviation RDS (Radio Data System). Therefore, per se known tuners provide the presence of two different decoding units on the reception side, the first unit for decoding of the traditional radio signals and the second unit for decoding of RDS data, the latter being subsequently sent directly to a display.

No receiving apparatus allows, based on given data such as, for example, a musical excerpt author's name, searching for any musical excerpt by the same author by frequency scanning, and after detecting one of such musical excerpts, playing the latter in the place of the present musical excerpt, or at the conclusion of the present musical excerpt.

SUMMARY OF THE INVENTION

The present invention overcomes such prior art problems by providing a receiving apparatus for the reception of radio signals transmitted by RDS system, comprising:

- a first tuner for selecting and receiving a first frequency;
- a second tuner for selecting, during the reception of said first frequency, a second frequency different from the first frequency and not included in the AF list of frequencies alternative to the first frequency;
- a memory unit for storing RDS data; and
- control means for controlling the switching in reception between the first and the second tuner, upon comparison of RDS data relative to said second frequency with the RDS data stored in the memory unit.

A method is moreover provided for receiving radio signals transmitted by RDS system characterized in that it comprises the following steps:

- selecting and receiving a first frequency;
- selecting, during the reception of the first frequency, a second frequency different from the first frequency and not included in the AF list of frequencies alternative to the first frequency; and
- switching the reception between the first and the second tuner, following comparison between RDS data relative to the second frequency and the previously stored RDS data.

Advantageous features of the present invention are provided in the dependent claims thereof.

Therefore, thanks to the present invention, given certain data such as, for example, the name of an author of a musical excerpt, it will be possible to scan the frequency spectrum searching for any musical excerpt played by said author and, subsequently to the detection of one of said musical excerpts, to play it either by replacing the musical excerpt reproduced at that moment or successive to it.

The present invention will be hereinafter disclosed by a preferred embodiment thereof, shown as a non-limiting example.

BRIEF DESCRIPTION OF THE DRAWINGS

Reference will be made in particular to the figures of the annexed drawings where.

DETAILED DESCRIPTION OF THE INVENTION

Figure 1:
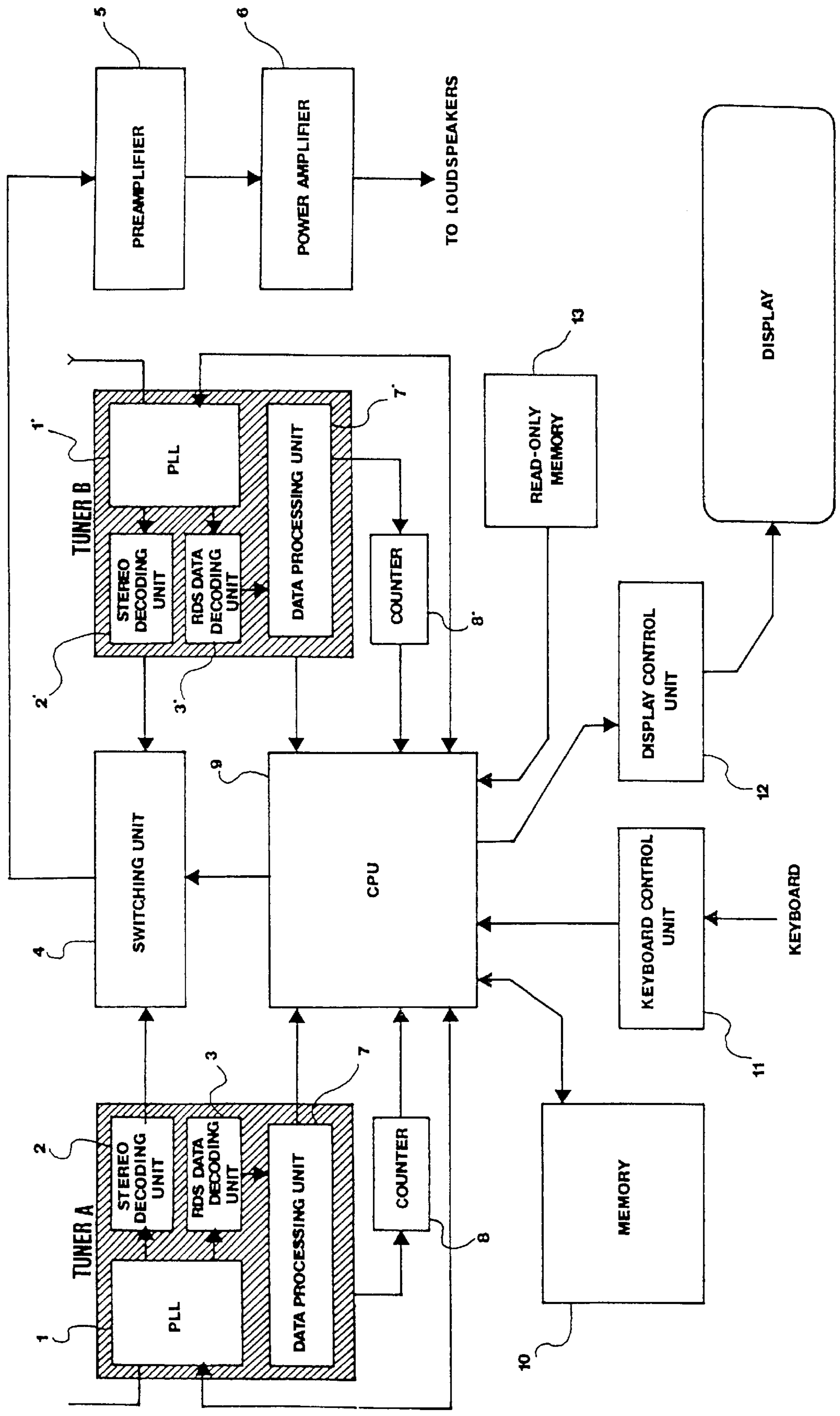
FIG. 1 shows a block diagram of the receiving apparatus hardware configuration according to the present invention.

Reference is firstly made to FIG. 1. Tuning of the receiving apparatus on a frequency of any radio station is carried out either by a tuner A or a tuner B (e.g. a Pioneer 2004A model). The tuner A comprises an antenna and a PLL (phase locked loop) unit 1 for search and capture of a desired frequency, connected to a stereo decoding unit 2 and to a RDS data decoding unit 3.

The stereo decoding unit 2 provides decoding of data relative to the musical excerpt to be played contained in the transmitted signal and to the transmission thereof, under control of a switching unit 4 (e.g. a solid state relay), described further on, to a preamplifier 5 (e.g. a Burr & Brown OP 27 AJ), to a power amplifier 6 (e.g. a Philips TDA 2020) and therefrom to the loudspeakers.

The RDS data decoding unit 3 provides decoding of RDS data contained in the transmitted signal. Said data are subsequently processed by means of a data processing unit 6 and therefrom transmitted to a counter 8 (e.g. a NE555 device) and to a CPU 9 (e.g. an Intel 386DX or a Motorola 68040). The counter 8 constitutes an internal independent time base inside the herewith described apparatus. Said counter is controlled by the data processing unit 7 and transmits data to the CPU 9.

The stereo decoding unit 2 and the RDS data 3 will not be illustrated in detail hereinafter, as they are known to the person skilled in the art.

Besides the standard RDS signals provided in traditional transmission systems, in the present embodiment additional RDS signals are to be provided, here described:

- An ATS (author title signal) which indicates the name of the broadcast musical excerpt's author;
- A TTL (title) signal, which indicates the title of the broadcast musical excerpt or radio program;
- A SSS (starting song signal) signal, which is activated at the beginning of the musical excerpt and remains active for a given time;
- A PTM (playing time) signal, which indicates the playing time elapsed since the beginning of the musical excerpt;
- A MTA (maximum time allowed) signal, originated in reception and set by the user, which establishes the desired maximum value within which musical excerpt reproduction should start once the captured musical excerpt has already begun;

A ESS (end song signal) signal, active from the beginning to the end of the musical excerpt; and A CPT (countdown playing time) signal for countdown of elapsed playing time since the beginning of the musical excerpt.

The use of the SSS and ESS signals is to be considered as an alternative to the use of the PTM and CPT signals.

The transmission of the RDS data is cyclic, not continuous. This may be a disadvantage, particularly with reference to the PTM signal, as its state in the present invention is checked various times by the CPU 9, as will be illustrated in more detail by the flow chart of subsequent FIG. 2. With regard to this, the presence of the counter 8 becomes therefore useful. The latter will be such as to provide, subsequently to the first acquisition, simulation of the playing time elapsed since the beginning of the musical excerpt (PTM signal), and therefore correct the possible accumulated error during the subsequent RDS data acquisition cycle.

In order to allow operation of the present invention, a second tuning unit must be provided, hereinafter referred to as tuner B. Such tuner is identical to tuner A. It therefore comprises an antenna, a PLL unit 1', a stereo decoding unit 2', a RDS data decoding unit 3' and a data processing unit 7'. A second counter 8' is moreover present, connected to the output of the data processing unit 7' for exactly the same purpose as the first counter 8'. During reproduction of a musical excerpt through the tuner A, it will be possible to scan the frequency spectrum, searching for a new musical excerpt through the tuner B or vice-versa, and, upon detection of a given musical excerpt, a switching between the two tuners will be made possible by means of the CPU 9 and of the switching unit 4.

The CPU receives as input the data from the data processing units 7 and 7' and from the counters 8 and 8'. It moreover outputs control data to the PLL 1 and 1' and to the switching unit, for controlling the switching between the tuner A and the tuner B, and, if needed, activating a new search. The CPU 9 is moreover connected to a memory unit 10, to a keyboard control unit 11, to a display control unit 12 (e.g. a Yamaha MU 80) and to a read-only memory 13. The memory unit 10, bidirectionally connected to the CPU 9, stores an archive of the musical excerpts and/or authors to be searched by means of one of the two tuners. The memory unit 10 can also store other important data, such as for example, statistical data, useful to establish a priority among the musical excerpts to the purpose of setting a search criterion. Therefore the memory unit 10 has a double function: on the one hand it is a "tank" for storing any number of musical excerpts, on the other hand, during the search step, it works as a comparing grid with the musical excerpts broadcast at that moment within the frequency spectrum under scanning.

The read-only memory 13 contains the software for controlling the operating modes of the apparatus according to the present invention.

The connection with the keyboard control unit 11 is of the unidirectional type, the data being transmitted, by means thereof, from the keyboard to the CPU 9. The connection with the display control unit 12 is of the unidirectional type, the data being transmitted, by means thereof, from the CPU 9 to the display. The connection with the read-only memory 13 is of the unidirectional type, the data being transmitted from the latter to the CPU 9.

Figure 2:
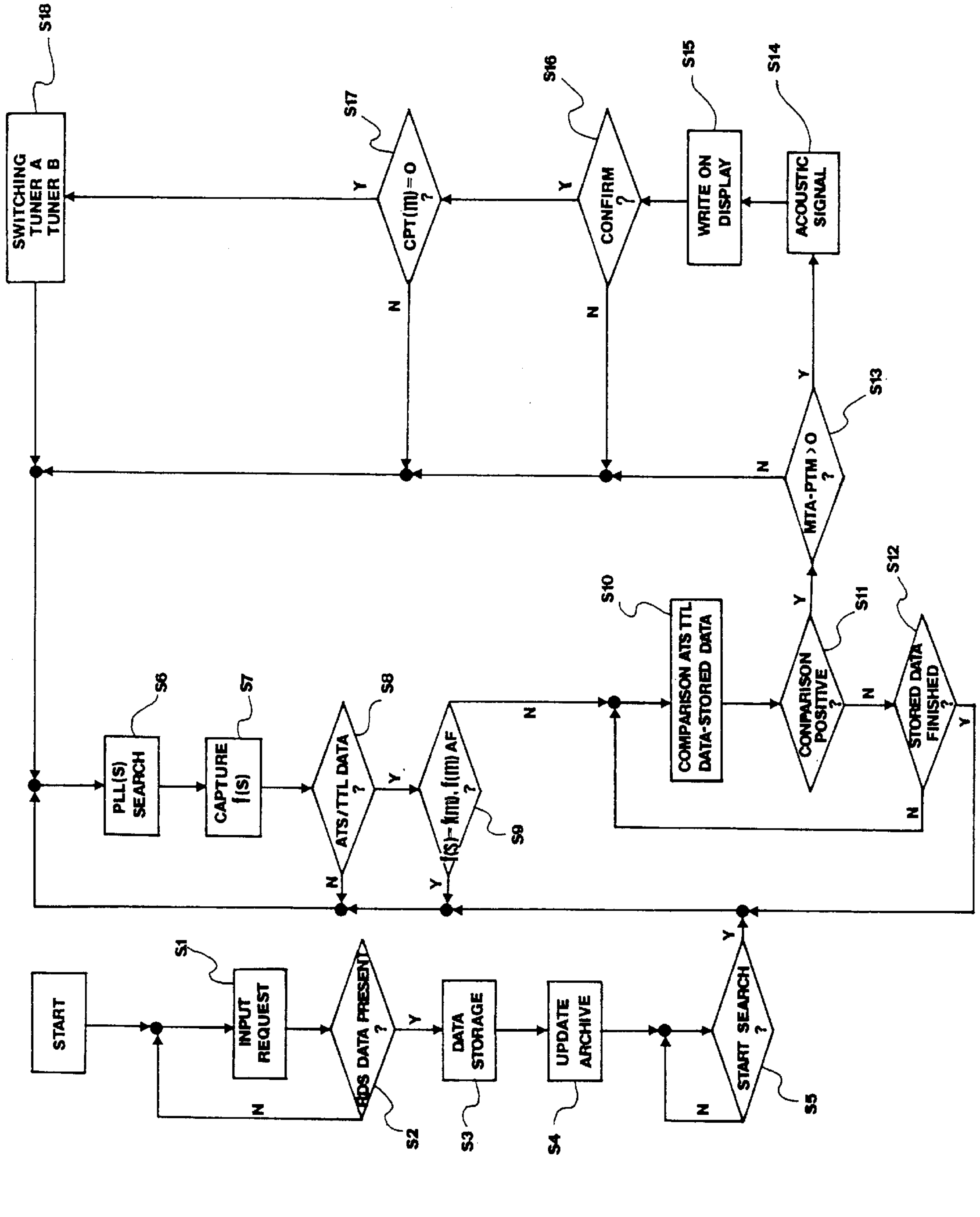
FIG. 2 shows a flow chart which illustrates the operating modes of the apparatus and of the method according to the present invention.

Subsequent FIG. 2 shows a flow chart for explaining the method by which search of the musical excerpt, based on the existing data in the memory unit 10, is carried out.

The search provides for a comparison between each musical excerpt of the excerpt archive in memory unit 10 and the stations transmitted at that moment within the frequency spectrum to be scanned.

The mode according to which updating of memory unit's 10 musical excerpts archive is carried out is described in the steps from S1 to S4. In the step S1 and during the reproduction of a given musical excerpt the user requests that the song be stored in the memory unit, for example by pressing a key. The subsequent step S2 checks firstly whether the station broadcasting the excerpt for which storage is requested contains the additional RDS data relative to the author's name (ATS) and/or to the musical excerpt's title (TTL) or not. In the case when such data are not present the storing procedure is ended. When, on the contrary, the data are present the flow proceeds toward the next steps S3 and S4, where storing of ATS and/or TTL data in the memory unit 10 and updating of the number of musical excerpts on which future search by means of frequency spectrum scanning can be based are respectively carried out. In such case it could happen that, following the comparison between data to be stored with existing memory data, no data storage will occur as said data are already stored, and this, if needed, could be signaled to the user on the display.

An alternative memory storage method can provide direct input of ATS and/or TTL data relative to the desired musical excerpt from a keyboard.

The actual search procedure will be described starting from step S5. In step S5, following the user's request, the search procedure can be started by comparing each musical excerpt stored in memory unit 10 with the excerpts broadcast within the searched-through frequency spectrum. It is to be understood that other comparison methods are possible, for example by comparing only one of the stored musical excerpts with the excerpts broadcast within the searched-through frequency spectrum. Said single musical excerpt could be chosen by the user or selected automatically, for example on the basis of statistical data.

Frequency scanning occurs in step S6 by means, for example, of the tuner B, in the case when a musical excerpt is being reproduced in that moment by the tuner A. The tuners A and B are anyway perfectly interchangeable; that is, if the musical excerpt being reproduced at that moment has been captured by the tuner B, the frequency scanning will be carried out by the tuner A. For clearness purposes the tuner operating the frequency scanning will be indicated by the letter S (slave), while the tuner tuned on the excerpt being broadcast a the moment will be indicated by the letter M (master). Once any f(S) frequency has been captured by the "slave" tuner in the step S7, checking of the presence of additional ATS and TTL RDS data in said frequency is carried out in the step S8. In the case of a negative result, step S6 is resumed and the search of an excerpt proceeds toward a new frequency. In the case of a positive result, it is first of all checked in step S9 if the captured frequency f(S) is identical to the frequency f(M) being transmitted at that moment or to the AF(M) list of frequencies alternative to the frequency f(M) and representative of the same broadcasting station. In the case of a positive result, the flow returns to the step S6, as of course there would be no reason to get tuned to a station which is already listened to at the moment. In the case of a negative result, the comparison between the ATS/TTL data provided in the captured frequency and the existing ATS/TTL data in the memory unit relative to the musical excerpt being searched is carried out in the step S10. In the evaluation step S11 the negative or positive result of the comparison is evaluated. In the case of a negative result, the flow proceeds toward a step S12, where the presence in the memory unit of further excerpts on which basis further comparison with the RDS data from the station captured in preceding step S7 can be executed is evaluated. If said data flow is not finished the flow returns to the step 10 and comparison is carried out again; in the opposite case the flow returns to the step S6. In the case when the result of the comparison in step S11 is positive, the difference between the MTA signal and the PTM signal is calculated in the step S13. As previously described, the MTA signal is a signal originated in reception, depending on the user's choice, which sets the maximum value of the time interval within which it will be played, once detected. In fact, it could happen that a user is not interested in listening to a musical excerpt which is about to end or however which has been playing for too long. The PTM signal, on the contrary, is a cyclic signal transmitted by the broadcasting station, and simulated by means of the counters 8 or 8', which indicates the reproduction time elapsed from the beginning of the musical excerpt. The excerpt will be played only in the case where it has not been played for too long, that is, if the above mentioned difference is bigger than zero, by transmitting an acoustic signal for the user in a step S14, and by presenting significant data (for example author and title in the case of a musical excerpt) on the display in the step S15. In the step S16 the user is requested to confirm his intention of playing the excerpt detected in the above-mentioned way (manual accepting mode).

In the subsequent step S17 actual ending of the musical excerpt played by the user up to that moment is checked. This can be easily verified by inspecting the CPT(M) signal relative to said excerpt. In the case where the CPT(M) signal is not zero (musical excerpt being played at the moment still to end) the detected musical excerpt is not played, and search of a new station is resumed by returning to the step S6. In the case when, on the contrary, the CPT signal is zero, in a subsequent step 18 both the CPU 9 and the switching unit 4 will provide the switching between the tuner A and the tuner B and, if needed, will update in the memory 10 statistical data relative to the selected musical excerpt in the memory unit 10. As already set forth above, said statistical data allow setting of priorities among the musical excerpts. On the basis of such priorities and in cases where the frequency scanning is based on all the existing musical excerpts in the memory unit 10, setting of musical excerpts to be searched before others will be made possible.

An alternative embodiment can provide the absence of the step S17, so that the selected excerpt can be played by interrupting the excerpt reproduced at that moment. As an alternative to what occurs in the step S16, an automatic switching after a predetermined time interval (auto-accepting mode) between the master tuner and the slave tuner, needing no confirmation on the user's part can be provided.

It is clear from descriptions made up to now that the search system in the preferred embodiment is always active, as the flow chart herewith attached does not provide a return upstream of step 5. When anyway a temporary interruption of a musical excerpt search is desired, starting of a stand-by cycle for a given time can be for example provided.

In the flow chart described heretofore no use has been made of the SSS and ESS signals previously referred to. Such signals can be used for replacing the PTM and CPT signals. In particular, the comparison in the step S13 should be carried out between the MTA and the SSS signals; the ESS signal can instead be used for replacing the CPT(M) signal in the step S17.

A further alternative search method can provide firstly a complete scanning of the frequency spectrum to be executed in order to acquire for each frequency its value and the possible RDS digital data related thereto. Once the scanning has been completed, firstly the frequencies containing no RDS data will be eliminated, then a comparison will be made between the stored data in the memory unit 10 and the list of data recently acquired, according to modes similar to those provided in FIG. 2.

Figure 3:
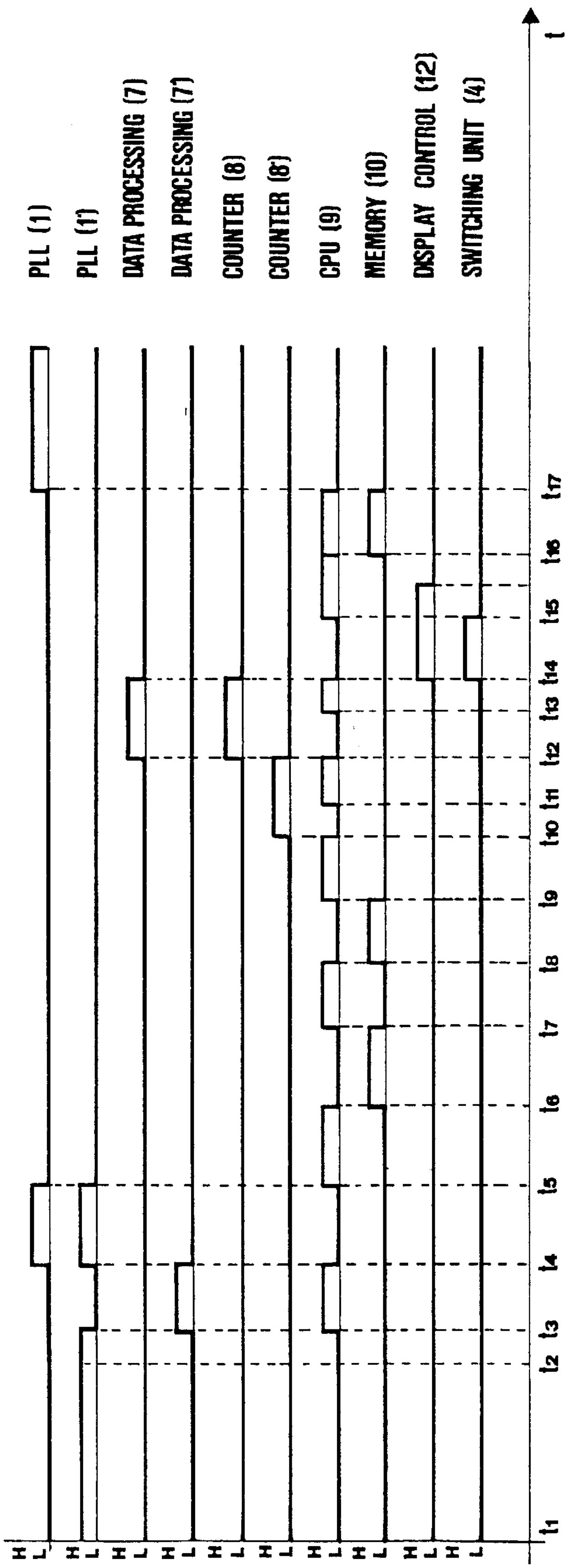
FIG. 3 shows a first timing diagram which illustrates in more detail the operating modes of the method and apparatus according to the present invention.

From now on reference will be made to FIG. 3, which shows a timing diagram illustrating the procedure according the present invention. In such diagram the operating intervals of the apparatus components according to the present invention are shown, i.e. the PLLs 1 and 1', the data processing units 7 and 7', the counters 8 and 8', the CPU 9, the memory 10, the display control unit 12 and the switching unit 4. Such intervals are represented in a binary logic as a function of time. A high logic value (H) means that the unit is in operation with reference to the illustrated process; a low logic value (L) means that the unit is not in operation with reference to the illustrated method. As to the counters 8 and 8' and the memory unit 10, a high logic value (H) indicates that these are being interrogated by the CPU 9, while a low logic value (L) indicates that these are not being interrogated by the CPU 9.

It is supposed that at the time instant t1 the tuner A (in particular the PLL 1) is the master tuner while the tuner B (in particular the PLL 1') is the slave tuner. During the time interval t1–t2 the search of the frequency domain is carried out by the PLL 1' (signal of PLL 1' with a high logic value). During the interval t2–t3 the PLL 1' captures a frequency (step 7 of FIG. 2); as a consequence of said occurrence, starting from the time instant t3, the data processing unit 7' transmits the ATS/TTL additional RDS data (if present, and herein presumed present) to the CPU 9, which checks for the presence of the latter, during the interval t3–t4. During the interval t4–t5 the PLL 1 and the PLL 1' transmit the respective tuning frequency values to the CPU 9, and the latter, during the t5–t6 interval, compares said values (step S9 of FIG. 2), here supposed different therebetween. During the interval t6–t7 the ATS/TTL data relative to one of the stored musical excerpts are read from the memory unit 10. During the interval t7–t8 the comparison is made in the CPU 9 between the ATS/TTL data read from memory during the previous interval and the ATS/TTL data of the frequency captured at that moment. The comparison is presumed to give a negative result, therefore during the interval t8–t9 the ATS/TTL data relating to the subsequent musical excerpt are read from memory 10; during the subsequent interval t9–t10 the new comparison takes place by means of the CPU 9 between the ATS/TTL data read from memory in the previous interval and the ATS/TTL data of the frequency captured at that moment. In this second case the comparison is presumed to give a positive result; as a consequence, during the interval t10–t11, the CPU 9 reads from the counter 8' the elapsed reproduction time value, and during the interval t11–t12 estimates the MTA–PTM difference. The result of such comparison is presumed positive (MTA–PTM>0). During the interval t12–t13 it is checked, by means of the data processing unit 7 and of the counter 8, the CPT signal value of the musical excerpt listened by the user at that moment (see step S17 of FIG. 2). The CPT signal value can be read only when a musical excerpt previously captured, i.e. not any other musical excerpt, is being played.

If, on the contrary, a not previously captured musical excerpt is being played, switching takes place in any case. In the case in object, switching is presumed to take place; during the interval t13–t14 the CPU therefore transmits the switching impulse to the switching unit 4, with the result that the tuner B becomes the master tuner and the tuner A becomes the slave tuner. During the interval t15–t16 the CPU 9 updates the musical excerpt capture statistics. During the subsequent interval t16–t17 the CPU 9 provides moreover to sort the data stored in the memory unit 10 based on the statistics, for example by assigning a lower ordinal number to the musical excerpt which has been captured the least number of times. At the time instant t17 a new frequency scanning is started, this time by the PLL 1, so that the operations described up to now are substantially repeated.

Figure 4:
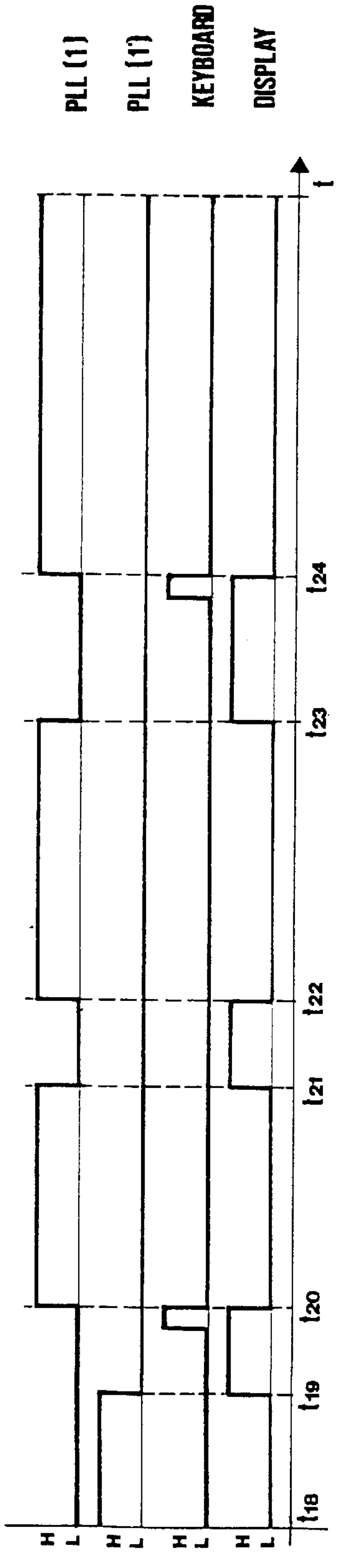
FIG. 4 shows a second timing diagram relative to the manual accepting mode of the proposed musical excerpts.

Subsequent FIG. 4 shows a timing diagram relative to the switching between master tuner and slave tuner in cases where the "manual accepting mode" switching function previously set forth with reference to the step S16 of FIG. 2 is operative. Such timing diagram shows the operating intervals of the receiving apparatus keyboard and display, as well as of the PLLs 1 and 1'. Such intervals are represented in a binary logic as a function of time.

It is supposed that, at the time instant t18 (whose temporal value is completely independent from the time instants t1 to t17 up to now considered) the PLL 1 (master) is tuned on whatever musical excerpt, and that the PLL 1' (slave) is in a searching mode. At the instant t19 the PLL 1' captures an excerpt and the display displays (step S15 of FIG. 2), in the interval t19–t20, data relative to the captured musical excerpt. In particular, instant t20 is the instant when the user confirms acceptance of the musical excerpt by means of the keyboard (step S16 of FIG. 2) and when the switching between the two tuners takes place. The condition referred to in the step S17 of FIG. 2 is in this case presumed positively met, for example because the previously played musical excerpt was not a captured one (CPT signal not present). During the interval t20–t21 the PLL 1 (slave in this case) starts again the search of further musical excerpts. A new excerpt is captured at the instant t21 and displayed during the interval t21–t22. In said second case, however, it is presumed that the user is not interested in listening to the proposed excerpt. The display therefore stops displaying the proposal of the excerpt when confirmation by the user does not occur after a predetermined time. The PLL 1 therefore is still the slave tuner and starts again the search, during the interval t22–t23, of a new station. At the instant t23 the PLL 1 captures a new musical excerpt and the display displays, during the interval t23–t24, data relative to the captured excerpt. If, however, at the instant t24, the user should choose to confirm the excerpt, it could happen, as it is presumed in the figure, that the condition referred to at the step S17 in FIG. 2 is not met. In such case no switching takes place between the tuners, and again the PLL 1 starts the search of the next musical excerpt.

Figure 5:
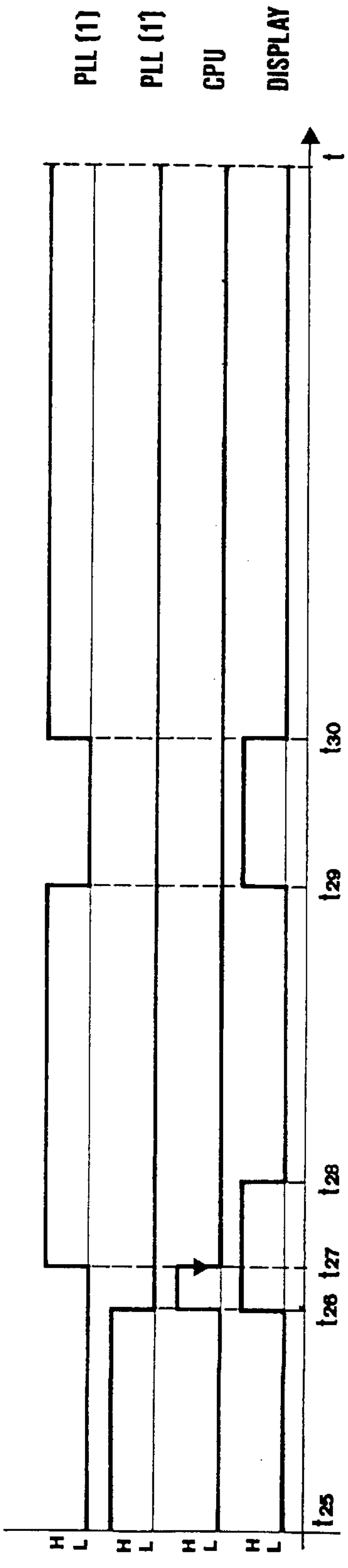
FIG. 5 shows a third timing diagram relative to the automatic accepting mode of the proposed musical excerpts.

Subsequent FIG. 5 shows a timing diagram relative to the switching between master tuner and slave tuner in the case where the "auto-accepting mode" switching function previously referred to, referring again to the step S16 of FIG. 2, is operative. Such timing diagram shows the operating intervals of the CPU and display of the receiving apparatus, as well as of the PLL 1 and 1'. Such intervals are represented in a binary logic as a function of time.

It is supposed that at the instant t25 the PLL 1 (master) is tuned on whatever musical excerpt and that the PLL 1' (slave) is in a searching mode. At the instant t26 the PLL 1' captures an excerpt and the display displays, during the interval t26–t28, data relative to the captured excerpt. At the instant t27 (therefore once a predetermined time interval has elapsed), the CPU transmits a switching impulse allowing the switching between the two tuners. The search is therefore restarted by the PLL 1 (slave), which captures the excerpt at the instant t29. The display displays, during the interval t29–t30, data relative to the captured excerpt. In this case the CPU 9 does not transmit a switching impulse because the condition S17 of previous FIG. 2 is not met (previously captured musical excerpt still being played). In such case no switching takes place between the tuners, therefore the PLL 1 continues to search for the next excerpt.

The present invention has been up to now described according to preferred embodiments, by way of non-limiting examples. A special application of the present invention may in fact relate to its use with digital systems of the DSR type (Digital Satellite Receiver) and/or the DAB type (Digital Audio Broadcasting). It is anyway to be understood that the application field of the present invention is determined not so much by the description as by the scope of the claims annexed hereinafter.

For example, by way of obvious and simple variations to what described up to now, it is possible to scan the frequency spectrum searching for RDS signals different from the ATS and/or TTL signals disclosed up to now.

We claim:

1. A receiving apparatus for reception of radio signals transmitted by an RDS system, including:

- a first tuner (1,2,3,7) for selecting and reception of a first frequency optionally containing RDS data;
- a second tuner (1',2',3',7') for selecting and reception of a second frequency, during the reception of said first frequency, the second frequency being different from the first frequency and not included in an AF list of frequencies alternative to the first frequency;
- a memory unit (10) for holding stored RDS data; and
- a controller (9) controlling switching of reception between the first and the second tuner, the controller being responsive to a comparison transmittal of RDS data relative to said second frequency with the stored RDS data in the memory unit (10).

2. The receiving apparatus of claim 1, further including counters (8,8') connected between the control means (9) and the first tuner or the second tuner, wherein the switching occurs upon comparison between a time elapsed between a beginning of an excerpt or program broadcast on said second frequency and a predetermined time.

3. The receiving apparatus of claim 1, wherein said switching occurs if the excerpt or program broadcast on the first frequency does not contain RDS data.

4. The receiving apparatus of claim 1, wherein said switching occurs if the excerpt or program broadcast on the first frequency contains RDS data and has finished.

5. The receiving apparatus of claim 1, wherein said transmitted RDS data comprise a first signal (TTL) which indicates a title of the broadcast excerpt or program.

6. The receiving apparatus of claim 5, wherein said RDS data further include a second signal (ATS) which indicates an author of the broadcast excerpt or program.

7. The receiving apparatus of claim 6, wherein said RDS data further include:

- a third signal (PTM), which indicates the playing time elapsed since a beginning of the broadcast excerpt or program;
- a fourth signal (MTA), originated in reception, which indicates a desired maximum interval within which starting of listening to the broadcast excerpt or program should begin, after it has already begun; and a fifth signal (CPT), for countdown of an elapsed playing time after the beginning of the broadcast excerpt or program.

8. The receiving apparatus of claim 7, wherein said RDS data further include:

a sixth signal (SSS), which is activated at the beginning of the broadcast excerpt or program and remains active for a given time;

a seventh signal (ESS), active from the beginning to an end of the broadcast excerpt or program, said sixth and seven signal being alternative to said third and fifth signal, respectively.

9. A method for the reception of radio signals transmitted by an RDS system comprising steps of:

selecting and receiving a first frequency optionally containing RDS data;

selecting, during reception of the first frequency, a second frequency, different from the first frequency and not included in an AF list of frequencies alternative to the first frequency;

storing RDS data; and switching reception between the first frequency and the second frequency upon a comparison between transmitted RDS data relative to the second frequency and previously stored RDS data.

10. The method of claim 9, wherein said switching occurs depending upon a comparison between a first time elapsed since an beginning of the excerpt or program broadcast on said second frequency and a predetermined second time.

11. The method of claim 9, wherein said switching occurs if the excerpt or program broadcast on the first frequency does not contain transmitted RDS data.

12. The method of claim 9, wherein switching occurs if the excerpt or program broadcast on the first frequency contains transmitted RDS data and is finished.

13. The method of claim 9, wherein said RDS data include a first signal (TTL) which indicates a title of the broadcast excerpt or program.

14. The method of claim 13, wherein said RDS data include a second signal (ATS) which indicates an author of the broadcast excerpt or program.

15. The method of claim 14, wherein said RDS data include:

a third signal (PTM), which indicates a playing time elapsed since a beginning of the broadcast excerpt or program;

a fourth signal (MTA), originated in reception, which indicates the desired maximum interval within which starting of listening to the broadcast excerpt or program should begin, after it has already begun; and a fifth signal (CPT), for countdown of an elapsed playing time after the beginning of the broadcast excerpt or program.

16. The method of claim 15, wherein said RDS data include:

a sixth signal (SSS), which is activated at the beginning of the broadcast excerpt or program and remains active for a given time;

a seventh signal (ESS), active from a beginning to an end of the broadcast excerpt or program, said sixth and seventh signal being alternative to said third and fifth signal, respectively.

* * * * *